United States Patent
Berglund et al.

[15] 3,697,197
[45] Oct. 10, 1972

[54] ICE CREAM PUMP

[72] Inventors: Harold A. Berglund, Afton; David F. Thomas, West St. Paul, both of Minn.

[73] Assignee: Waterous Company, St. Paul, Minn.

[22] Filed: Aug. 6, 1970

[21] Appl. No.: 61,658

[52] U.S. Cl. ............................... 417/360, 417/415
[51] Int. Cl. ...... F04b 17/00, F04b 35/00, F04b 35/04
[58] Field of Search ............................ 417/360, 415

[56] References Cited

UNITED STATES PATENTS 2,005,578    6/1935    Drysdale ............... 417/415 X
2,853,226    9/1958    Maniscalco, Sr. ...... 417/415 X

FOREIGN PATENTS OR APPLICATIONS 1,267,797    1/1960    France ..................... 417/415

*Primary Examiner*—Robert M. Walker
*Attorney*—Robert M. Dunning

[57] ABSTRACT

A double acting pump is provided for pumping air in one cylinder and liquid mix into another. The cylinders and valve housings, together with the inlet and outlet fittings, are readily separable for cleaning. The entire pump unit may be disassembled for cleaning by the removal of four knobs or nuts.

16 Claims, 11 Drawing Figures

INVENTOR
HAROLD A. BERGLUND
DAVID F. THOMAS
BY Robert M. Dunning
ATTORNEY

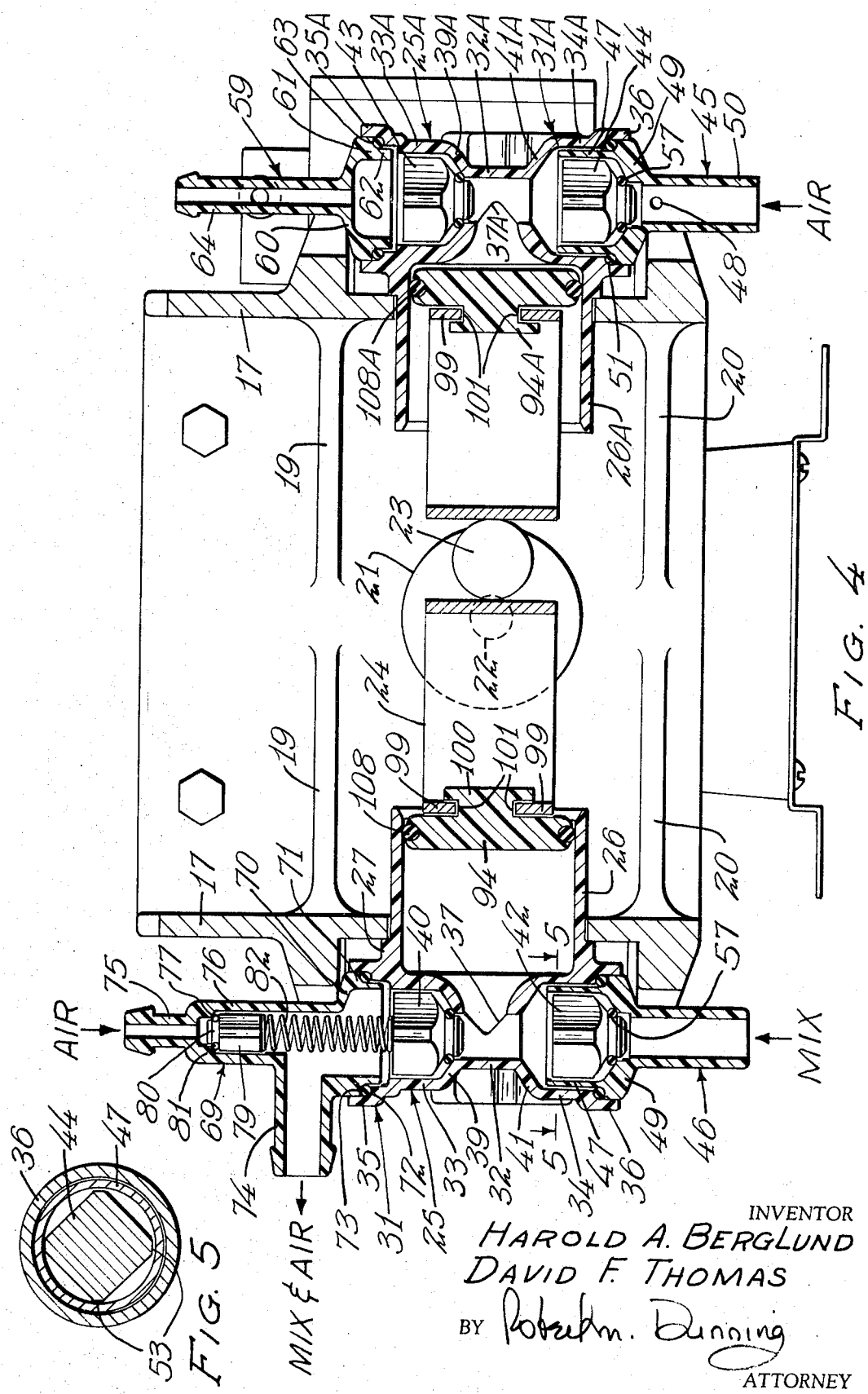

INVENTOR
HAROLD A. BERGLUND
DAVID F. THOMAS
BY Robert M. Dunning
ATTORNEY

ICE CREAM PUMP

This invention relates to an improvement in the ICE CREAM PUMP and deals particularly with a pump capable of pumping air and a liquid mix, and combining the air with the mix in a desired ratio.

BACKGROUND OF THE INVENTION

In the mechanical production of ice cream, sherbert, ice milk, frozen custards and other frozen dessert products, a liquid mix is normally combined with a non-toxic gas such as air, nitrogen, nitrous oxide, or freon in order to produce a tasteful, palatable and profitable end product. The mixture is directed to a suitable freezer in which the mixture is frozen, and from which the frozen mixture may be dispensed. The liquid mix and air are supplied to the freezing chamber as the frozen product is dispensed, and the operation is normally automatically controlled. The product in the freezing chamber is maintained under pressure. As the frozen product is dispensed, the pressure drops and the pump mechanism is actuated to pump more of the mixture of liquid mix and air to the freezing compartment until the desired pressure is attained.

One of the difficulties experienced with previous pumping equipment lies in the fact that it is difficult to maintain the apparatus in a clean and sanitary condition. The equipment must be thoroughly cleaned from time to time to prevent the growth of bacteria. If the pump mechanism is difficult to disassemble and clean, there is a tendency for the operator to delay the cleaning operation and to clean the apparatus at less frequent intervals. One of the areas most difficult to clean often comprises the pressure control valve, the diaphragm of which is usually contacted by the mixture of air and liquid mix. This area is usually difficult and time consuming to clean, it is, therefore, of utmost importance that the apparatus be easy to take apart and put together so that it may be cleaned at proper intervals by relatively unskilled personnel.

SUMMARY OF THE INVENTION

An object of the present invention resides in the provision of a double acting pump including a pair of opposed cylinders, and a pair of pistons mounted at opposite ends of a piston bar reciprocated by an eccentric cam roller rotating about an axis of rotation. As the piston reciprocates in one direction, liquid mix is forced from one cylinder to a mixing chamber where it is combined with air. Simultaneously, air is drawn into the opposite cylinder. As the piston rod is reciprocated in the opposite direction, air is forced under pressure from the opposite cylinder, and liquid mix is drawn into the first cylinder. The air under pressure from the opposite cylinder is mixed with the liquid mix in the mixing chamber and forced into the freezer unit.

An important feature of the present invention lies in the simplicity of construction. The device includes a motor mounted upon a base and to which is secured the base panel of a generally U-shaped pump frame having parallel sides. A cam follower crank is mounted upon the motor shaft and supports an eccentric bearing. Cylinders extend in opposed relation through the parallel sides of the pump frame on a common axis. The inner opposed ends of the cylinders are open. Pistons are removably supported upon a piston rod or bar. This bar is shaped to provide a central vertical channel in which the eccentric bearing is engaged. Rotation of the motor accordingly reciprocates the pistons in the opposed cylinders.

A feature of the present invention resides in the provision of cylinders combined with integrally connected valve housings. The valve housings are arranged on parallel vertical axes and are closed at their lower ends by inlet fittings. The valve chambers are provided with suitable outlet fittings at their upper ends. The side plates of the pump frame are provided with vertically spaced yokes between which the valve chambers with the inlet and outlet fittings telescoped therein are received. These yokes hold the valve chambers in vertical position, and hold the inlet and outlet fittings assembled to the valve chambers. The cylinders extend through aligned apertures in the sides of the pump frame, and each cylinder, together with the integral valve chambers and the inlet and outlet fittings are held in place by a pair of knobs or nuts threaded on studs projecting outwardly from the sides of the pump frame on opposite sides of the cylinder apertures. By removal of these knobs, the entire assembly may be removed and completely disassembled for cleaning.

A further feature of the present invention resides in a provision of a simple check valve arrangement controlling the flow into and out of the valve chamber. Each check valve comprises a valve body vertically slidable in the valve chamber and having a tapered lower end which is circumferentially grooved to accommodate an O-ring. This sealing ring seats against either a portion of the valve chamber or the inlet fitting to form a seal. The valve bodies are preferably rectangular in section so that the liquid or air may flow freely about the valve when it is open. The valve bodies are made of stainless steel or other relatively heavy material so as to seat by gravity, eliminating the necessity of springs.

A further feature of the present invention resides in the provision of a pressure actuated control switch which is connected to the outlet fitting of a valve chamber connected to the air cylinder. As a result, the switch diaphragm communicates only with the air and accordingly does not come into contact with the liquid mix, eliminating the necessity of cleaning the switch diaphragm.

A further feature resides in the provision of a means for readily detaching the encircling sealing ring from each piston. A finger notch is provided communicating with the peripheral groove to facilitate removal of the sealing ring.

These and other objects and novel features of the present invention will be more clearly and fully set forth in the following specification and claims.

BRIEF DESCRIPTION OF THE DRAWINGS

FIG. 4 is a vertical sectional view through the pump, the position of the section being indicated by the line 4—4 of FIG. 2.

FIG. 5 is a sectional view through one of the check valves, the position of the section being indicated by the line 5—5 of FIG. 4.

DESCRIPTION OF THE PREFERRED FORM OF CONSTRUCTION

Figure 1:
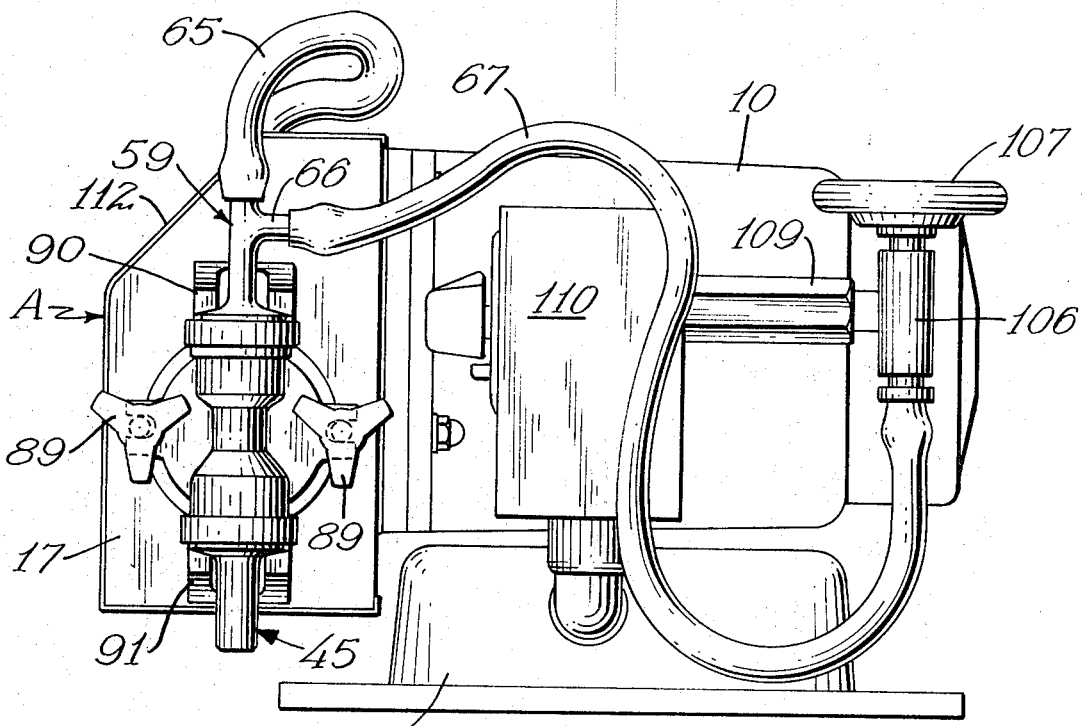
FIG. 1 is a side elevational view of the pump in readiness for operation.
Figure 2:
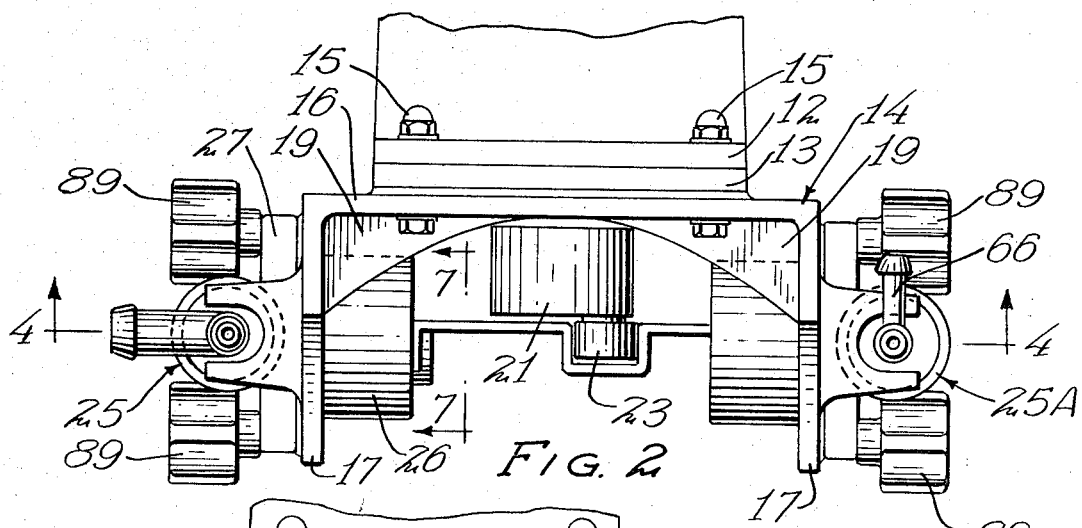
FIG. 2 is a top plan view of the assembled pump.
Figure 3:
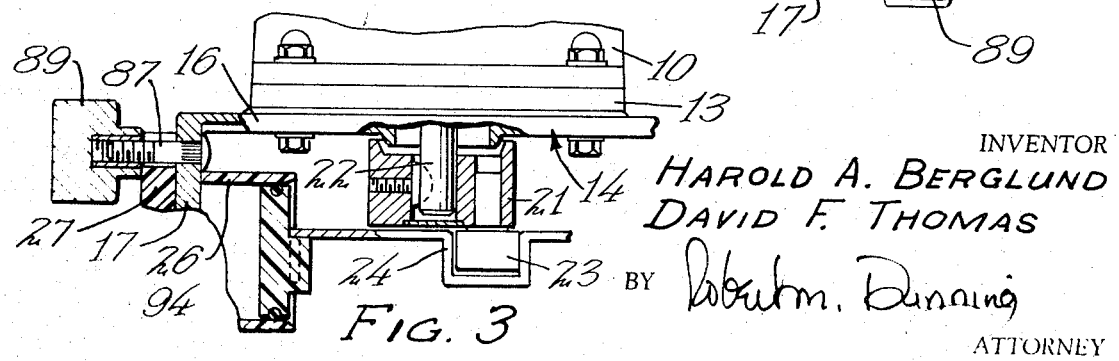
FIG. 3 is a horizontal sectional view through the motor axis showing the portions of the piston bar or rod and one of the pistons.

The pump is indicated in general by the letter A. The pump includes a motor 10 which is mounted upon a supporting base 11. The motor 10 is provided with a flange to which is secured a mounting plate 13. A pump frame indicated in general by the numeral 14 is bolted or otherwise secured to the flange 12 and plate 13 by bolts 15. The pump frame 14 includes a base plate 16 which supports a pair of forwardly projecting parallel frame sides 17. A pair of generally triangular upper reinforcing ribs 19 and a similarly shaped lower pair of reinforcing ribs 20 are provided to strengthen the pump frame. A cylindrical crank 21 is mounted on the shaft 22 of the motor 10 and supports an eccentric bearing 23. The eccentric bearing 23 is designed to reciprocate the piston rod 24 which will be later described in detail.

Figure 6:
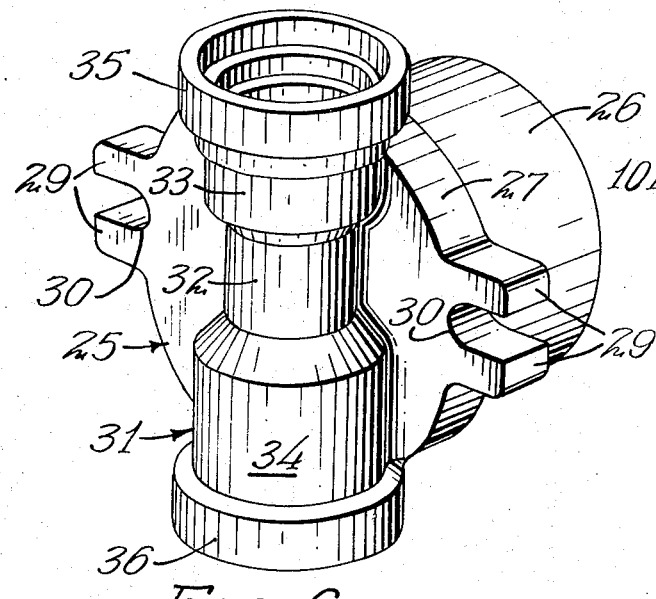
FIG. 6 is a perspective view of one of the cylinder and valve chamber units.

A cylinder and a valve housing unit indicated by the numeral 25 is supported upon each pump frame side 17. As indicated in FIG. 6 of the drawings, each unit 25 includes a cylinder 26 having an open inner end and having a flange 27 at its opposite end. Spaced pairs of ears 29 extend outwardly from diametrically opposite sides of the flange 27, the ears 29 being spaced to provide grooves 30 therebetween designed to accommodate mounting studs on the sides 17 of the frame 14. Integral with the flange 27 is a valve housing member 31 including a relatively small diameter central portion 32, to which is connected an upper larger diameter portion 33 and a lower larger diameter portion 34. An upper cylindrical sleeve 35 forms an extension of the upper chamber portion 33, and a lower sleeve portion 36 forms a downward extension of the valve chamber portion 34. The entire unit 25 may be cast of plastic or other suitable material which can be readily cleaned and sterilized.

With reference to FIG. 4 of the drawings, it will be noted that an opening 37 is provided between the small diameter center portion 32 of the valve chamber 31 and the interior of the cylinder 26. As shown in this figure, the frusto-conical connecting portion 39 of the housing between the small diameter portion 32 and the upper larger diameter portion 33 forms a seat for a check valve 40. The frusto-conical portion 41 between the small diameter portion 32 and the larger diameter lower portion 34 of the valve chamber forms a stop to limit upward movement of an inlet check valve 42. In the same manner, the smaller diameter portion 32A of the valve housing at the right of FIG. 4 is provided with an opening 37A communicating with the interior of the cylinder 26A, and the frusto-conical portion 39A connecting the small diameter portion 32A with the larger diameter upper portion 33A forms a seat for a check valve 43. The frusto-conical connecting portion 41A acts to limit upward movement of the check valve 44.

The air inlet fitting 45 and the mix inlet fitting 46 are of generally identical form and similar identifying numbers will be used. The fittings 45 and 46 include a cylindrical sleeve 47 which fits within the larger diameter housing portion 34A, and substantially frusto-conical connecting portion 49 connects the sleeve 47 with a smaller diameter sleeve 50. A sealing ring 51 encircles the base of the sleeve 47 and fits between the outer periphery of the frusto-conical portion 49 and the base of the housing sleeve 36. The check valve 44 is designed to seat against the frusto-conical portion in closed position of this valve. The air inlet fitting additionally includes holes 48 in the wall hereof. The holes 48 prevent malfunction of the pump in the event the liquid mix supply hose is accidentally attached to the air inlet fitting by bleeding air into the fitting above the hose connection.

Figure 10:
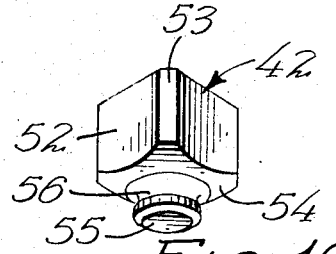
FIG. 10 is a perspective view of one of the check valves with the sealing ring removed.

The check valves 40, 42, 43, and 44 are all identical and are constructed as best illustrated in FIG. 10 of the drawings. The valve is provided with a generally rectangular body portion 52 having slightly rounded corners as indicated at 53 which fit in the enclosing wall in the manner illustrated in FIG. 5 of the drawings. The rectangular body 52 is provided with a slightly tapering lower end 54 which terminates in a substantially cylindrical downward projection 55 having a peripheral groove 56 extending thereabout. The groove 56 is designed to accommodate a sealing ring 57 which may be of substantially circular cross section, and which forms the actual seal. The valve bodies 53 are preferably made of stainless steel or other relatively heavy materials so that the valves may seat by gravity. The flat sides of the body permit the flow of air or fluid about the valve body when the valve is in open position.

An air outlet fitting 59 closes the top of the valve chamber 31A or valve chamber housing as indicated in FIG. 4. The upper fitting 59 includes a ring shaped closure member 60 having a depending peripheral skirt including a larger diameter portion 61 and a smaller diameter lower portion 62. The skirt portion 61, 62, is designed to telescope into the upper end of the sleeve 35A and into a groove 63 in the inner wall surface of the valve chamber slightly beneath the sleeve 35A. An integral tube 64 extends upwardly from the ring shaped plate 60 and is designed to accommodate the end of a hose 65 (see FIG. 1). The upper fitting 59 is actually a T connector having a branch 66 adapted to accommodate the end of a second hose 67 leading to the pressure actuated switch.

The outlet fitting 69 forming an extension of the upper end of the valve housing 31 on the left side of FIG. 4 includes a slightly tapered ring shaped upper closure 70 designed to extend into the upwardly extending sleeve 35 on the valve housing, and a depending skirt portion 71 which fits into a cavity 72 inwardly of the sleeve 35, the fitting 69 and valve housing being sealed by a sealing ring 73. The fitting 69 is a T connector having an outlet sleeve 74 extending laterally and an air inlet sleeve 75 extending upwardly therefrom. The upper end of the air inlet sleeve 75 is a relatively small diameter while the lower portion thereof is of a larger diameter as indicated at 76. This provides a valve seat 77 between the portions different diameter. A check valve 79 which is preferably of generally square cross section includes an upwardly projecting grooved end 80 which accommodates a sealing ring 81 designed to form the seal between the valve 79 and the upper portion of the air intake sleeve 75. The valve 79 is urged upwardly by a spring 82 which may rest upon the upper surface of the check valve 40 or may be otherwise supported within the outlet fitting. The valve 79 differs from the previously described check valves in that this valve may be made of plastic or other relatively light weight materials in view of the fact that it must be forced upwardly in closed position by the spring. The flexible tube 65 shown in FIG. 1 is connected to the air inlet sleeve 75 so that air forced from the right hand piston in FIG. 4 is directed to the top of the outlet fitting 69.

Figure 9:
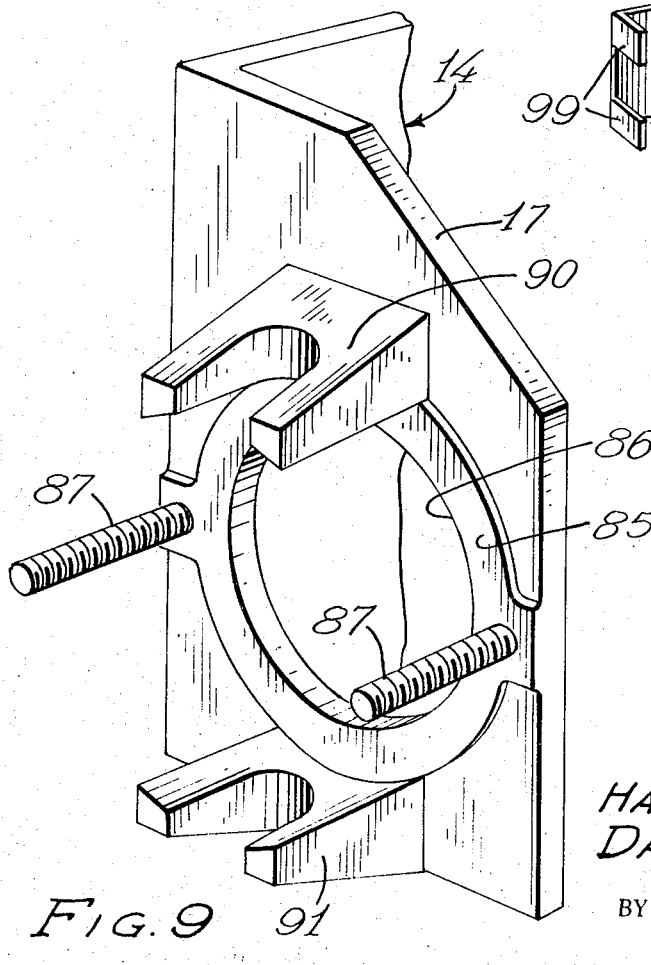
FIG. 9 is a perspective view of one side of the pump frame.

With reference now to FIGS. 6 and 9 of the drawings, the manner of securing the pistons, valve housings, and inlet and outlet fittings in place is indicated. The outer surface of each side 17 of the pump frame 14 is provided with a generally circular ring shaped area 85 encircling an aperture 86 of proper size to accommodate a cylinder such as 26 extending therethrough. Studs 87 are anchored in the side 17 on diametrically opposite sides of the aperture 86, and extend through the slots 30 between the laterally projecting ears 29 on the peripheral flange 27 encircling the cylinder. Threaded knobs 89 may be threaded onto the studs 87 to hold the cylinder and valve housing units in place. An upper bifurcated yoke 90 projects outwardly from the side 17 above the ring shaped faced area 85, and a lower bifurcated yoke 91 projects outwardly from the frame side 17 beneath the ring shaped face area 85. It will be noted that the under surface of the upper yoke 90 and the upper surface of the lower yoke 91 are slightly concave to fit the contour of the inlet and outlet fittings. The upper yoke 90 engages the upper surface of the air outlet fitting 59 or the upper surface 70 of the outlet fitting 69 while the yoke 91 engages the under surface of the ring shaped connecting portion 49 of the inlet fittings 45 or 46. The yokes 90 and 91 hold the inlet and outlet fittings sealed to the valve housing, and holds the valve housings in a vertical upright position.

Figure 8:
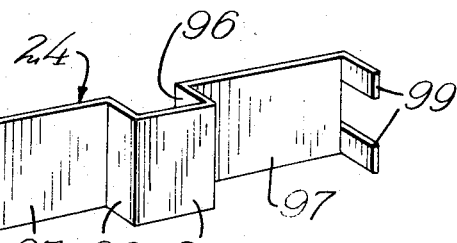
FIG. 8 is a perspective view of the piston rod.

The connecting rod or bar 24 acts to connect a pair of similar disc-like pistons 94 and 94A which are reciprocable in the cylinders 26 and 26A. The connecting rod 24 is shaped as is best indicated in FIG. 8 of the drawings. The connecting rod includes a center portion 95 which is connected along opposite edges to parallel right angularly extending panels 96 which define a channel of rectangular section designed to accommodate the eccentric bearing 23. The edges of the panels 96 opposite those connected to the center panel 95 are connected to panel portions 97 which are on a common plane. The panels 97 terminate in pairs of vertically spaced right angularly extending fingers 99 which are designed for connection with the pistons.

Figure 7:
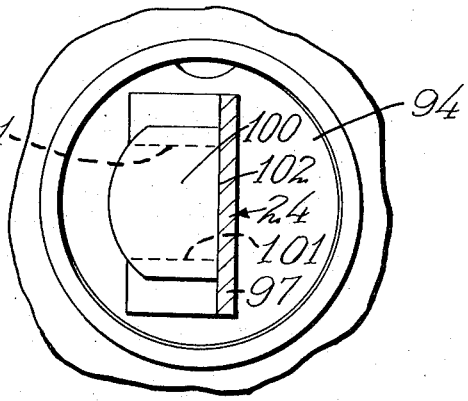
FIG. 7 is a sectional detail through the piston rod looking toward one of the pistons, the position of the section being indicated by the line 7—7 of FIG. 2.
Figure 11:
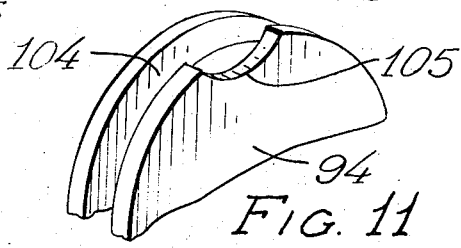
FIG. 11 is a perspective view of the end of one of the pistons, showing the notch employed to simplify the removal of the sealing ring from the piston.

As indicated in FIG. 7 as well as FIG. 4, each piston such as 94 is provided with a boss 100 projecting in an axial direction from a surface thereof. The boss 100 is provided with grooves 101 in the upper and lower surfaces thereof adjoining the piston surface, the bases of the grooves 101 being parallel and being spaced to accommodate the fingers 99. Each boss 100 is provided with a flat side 102 which bears against a panel portion 97 of the connecting rod 24. As will be noted, the pistons such as 94 are readily removable from the connecting rod 24 and may be removed and cleaned whenever desired. The pistons 94 are provided with a peripheral groove 104 to accommodate a sealing ring 105, as indicated in FIGS. 7 and 11 of the drawings. A notch 105 is provided communicating with the groove 104 and being of a depth at least equal to the depth of the groove 104. This notch 105 provides a means of access to the sealing ring 104 so that a portion of the sealing ring may be grasped and stretched outwardly to remove the ring from the groove. This notch 105 thus simplifies the task of removing the sealing rings from the piston grooves 104 and encourages the machine operator to fully disassemble the pistons for cleaning purposes.

The hose 67 is connected to a T connector 106 having a pressure gauge 107 extending into one branch of the cross member of the T so that the existing air pressure may be readily noted. One branch of the T is connected to stem 109 of the pressure control switch 110 controlling the current to the motor 10. The control switch may be of the type known as "type H5 knob and dial adjustment general purpose pressure vacuum control" produced by the United Electric Controls Company of Watertown, Mass. The control merely functions to turn on the motor 10 when the air pressure falls below a predetermined minimum, and to turn off the motor when the air pressure reaches a predetermined maximum.

The operation of the pump is believed obvious from the foregoing description. During each cycle of operation, air is drawn into the air cylinder by movement of the piston in one direction, and forced from the air cylinder through the discharge fitting 59 during the compression stroke of the piston 94A. During each cycle of operation, liquid mix is drawn into the cylinder 26 by movement of the piston 94, and then is forced upwardly past the check valve 40 as the piston 94 moves in the opposite direction. Air and liquid are mixed and discharged through the connection 74 and through suitable conduits to the freezer.

By removing the knobs 89 at one end of the unit, the cylinder and attached valve housing as well as the inlet and outlet fittings may be detached from the corresponding end plate 17. The inlet and outlet fittings may be pulled out of the valve housing, and the check valves are free to drop out of place, and completely disengaging the unit. All the parts are accordingly immediately available for cleaning. The pistons may be disengaged from the piston rods 24, and the sealing rings 105 may be easily removed from the pistons 94 to completely disassemble the unit. Obviously, the sealing rings on the check valves may also be readily removed, cleaned and replaced.

The operating mechanism is normally concealed and protected by a cover 112 which is bent to fit the shape of the ends 17 of the pump frame.

The present apparatus includes a novel feature of overrun variation accomplished by use of the readily accessible control knob on the pressure control switch 110. A further innovation within this capability is that the cylinder/piston design permits a built-in compression ratio/operating pressure characteristic covering a very broad range of resulting overrun percentages, but still allowing a choice of narrow operating ranges within each of which a manual range adjustment is possible.

To understand the meaning of "overrun," we start with a pint of liquid mix, the net weight of which may weigh for example, 18.4 ounces. Air is injected into the mix, and it is frozen. If the frozen mixture is replaced in the one pint container, there will be product left over. With the air added, the volume will increase and the weight per pint will decrease. The amount of product left over when the pint container is filled comprises the "overrun." This can be accurately determined by weighing the pint of frozen product and comparing this weight to the weight of the liquid mix. The formula for determining the percentage of overrun is as follows:

$$\text{Percent of overrun} = \frac{(X-Y)(100)}{Y}$$

Where X is the weight of a unit (for example 1 pint) of liquid mix, and Y is the weight of 1 pint of the frozen mix. As a specific example, if the weight of 1 pint of liquid mix is 18.4 ounces, and the weight of 1 pint of frozen product is 9.2 ounces, the formula will be $$\frac{(18.4-9.2)(100)}{9.2} = \frac{9.2(100)}{9.2} = 100\% \text{ overrun}$$

The following table indicates various percentages of overrun of the frozen product where the net weight of the liquid mix is 18.4 ounces.

| Net weight of Frozen Product | % of overrun |
|---|---|
| 18.40 ounces | 0% |
| 16.73 ounces | 10% |
| 15.33 ounces | 20% |
| 14.15 ounces | 30% |
| 13.14 ounces | 40% |
| 12.27 ounces | 50% |
| 11.50 ounces | 60% |
| 10.82 ounces | 70% |
| 10.22 ounces | 80% |
| 9.68 ounces | 90% |
| 9.20 ounces | 100% |

The present device is unique in that the percent of overrun may be regulated by varying the maximum air pressure. As the pressure is lowered the percentage of overrun decreases. Thus, while the volume displaced by the piston during each stroke may remain constant, a broad range of overrun variation is obtainable, because the weight of air delivered is affected by the discharge pressure as well as by the clearance volume of the cylinder and passages to and from the valves.

It is important to note that the various check valves 40, 42, 43, and 44 all are guided by portions which are integral with the valve seats, so that correct alignment of the valves and their seats is assured. The upper valves 40 and 43 are slidable within the enlarged diameter portions 33 and 33A of the valve housings 25 and 25A, and the valve seats are formed by the integral connecting portions 39 and 39A. The lower check valves 42 and 44 are slidable in the cylindrical sleeves 47 of the fittings 45 and 46, and the valve seats are formed by the integral frusto-conical portions 49. Thus, the check valves all slide in cylindrical portions which are integral with valve seats.

In accordance with the patent statutes we have described the principles of construction and operation of our ICE CREAM PUMP, and while we have endeavored to set forth the best embodiment thereof, we desire to have it understood that obvious means may be made within the scope of the following claims without departing from the spirit of our invention.

We claim:

1. A readily dismountable pump assembly for use with a pump frame having a base panel and a pair of right angularly extending frame sides thereupon, and including a motor secured to said base panel and having a motor shaft on an axis normal to said base panel, said motor extending from said base panel in a direction opposite to the direction of said frame sides from said base panel, said base panel having an aperture therethrough intermediate said frame sides aligned with said motor shaft and exposing the same, the pump assembly including:

a pair of cylinders having open ends,
said frame sides having aligned apertures therethrough through which said cylinders extend with the open ends thereof in inner opposed relation,
means detachably securing said cylinders to said side plates,
pistons slideable in said cylinders,
readily detachable piston rod means connecting said pistons for movement in unison,
valve housings connected to, and communicating with the outer ends of said cylinders, and including readily removable check valves on either side of the communication with said cylinders, and
means on said motor shaft detachably engaged with said piston rod means for reciprocating said piston rod means upon rotation of said motor shaft.

2. The structure of claim 1 and in which said pistons are disc-like bodies.

3. The structure of claim 2 and including bosses projecting inwardly from the inner surfaces of said disc-like bodies, and said piston rod includes means interengaging with said bosses.

4. The structure of claim 2 and in which said pistons are peripherally grooved, and including a resilient sealing ring in each of said grooves and projecting therefrom.

5. The structure of claim 4 and in which each said piston includes a notch in the periphery thereof on one side of said groove providing access to said resilient sealing ring.

6. The structure of claim 1 and in which said pistons include inwardly projecting bosses, and said piston rod includes right angularly extending means detachably secured to said bosses.

7. The structure of claim 6 and in which the right angularly extending means on said piston rod comprise spaced fingers, and in which said bosses are grooved to accommodate said fingers.

8. The structure of claim 1 and in which said valve housings are arranged on substantially vertical axes, and in which said check valves are gravity actuated.

9. The structure of claim 1 and in which said means detachably securing said cylinders to said side plates include stud and nut means.

10. The structure of claim 1 and including a pair of yokes extending outwardly from opposite sides of said cylinders, and threaded means forming the means detachably securing said cylinders to said side plates extending through said yokes.

11. The structure of claim 10 and in which said threaded means include studs projecting in parallel relation outwardly from each said frame sides through said yokes, and including threaded knobs on said studs.

12. The structure of claim 1 and in which said piston rod includes a central offset portion connected to the remainder thereof along parallel sides and said means on said motor shaft comprises a crank supporting a cylindrical bearing engageable with said parallel sides.

13. The structure of claim 12 and in which said crank is cylindrical.

14. The structure of claim 12 and in which said piston rod includes right angularly extending end with which said pistons are detachably engaged.

15. A pump assembly for use with a pump frame having a base panel and a pair of parallel right angularly extending frame sides, and including a motor secured to said base panel having a motor shaft on an axis normal to said base panel, said base panel having an aperture aligned with said motor shaft and exposing the same, the pump assembly including:
   a pair of cylinders having open ends,
   valve housing connected to other ends of said cylinders and including check valves arranged to control the flow of fluid into and out of said cylinders,
   said parallel frame sides having aligned apertures through which said cylinders may extend with the open ends thereof innermost,
   pistons in said cylinders,
   piston rod means connecting said pistons for movement in unison,
   means on said motor shaft engageable with said piston rod means for reciprocating the same upon rotation of said motor shaft,
   inlet and outlet fittings in telescoping relation to said valve housings, and including means on said parallel frame sides for holding said fittings in telescoping relation to said valve housing when said cylinders are extending through said aligned apertures.

16. The structure of claim 15 and in which said means on said frame sides comprise vertically spaced yokes engaging said fittings.

* * * * *